(12) United States Patent
Kirk

(10) Patent No.: US 11,415,047 B2
(45) Date of Patent: Aug. 16, 2022

(54) BOUNDAY LAYER TURBINE

(71) Applicant: James F Kirk, Santa Cruz, CA (US)

(72) Inventor: James F Kirk, Santa Cruz, CA (US)

(*) Notice: Subject to any disclaimer, the term of this patent is extended or adjusted under 35 U.S.C. 154(b) by 0 days.

(21) Appl. No.: 17/319,547

(22) Filed: May 13, 2021

(65) Prior Publication Data
US 2021/0355867 A1 Nov. 18, 2021

Related U.S. Application Data

(60) Provisional application No. 63/025,714, filed on May 15, 2020.

(51) Int. Cl.
*F02C 3/16* (2006.01)
*F01D 1/36* (2006.01)
*F23R 3/52* (2006.01)

(52) U.S. Cl.
CPC .............. *F02C 3/165* (2013.01); *F01D 1/36* (2013.01); *F23R 3/52* (2013.01); *F05D 2220/32* (2013.01); *F05D 2230/60* (2013.01); *F05D 2240/35* (2013.01)

(58) Field of Classification Search
CPC .... F02C 3/14; F02C 3/16; F02C 3/165; F01D 1/36; F23R 3/52; F05D 2220/32; F05D 2230/60; F05D 2240/35
See application file for complete search history.

(56) References Cited

U.S. PATENT DOCUMENTS

| | | | | |
|---|---|---|---|---|
| 6,692,232 B1* | 2/2004 | Letourneau | .............. | F01D 1/36 416/198 A |
| 2005/0169743 A1* | 8/2005 | Hicks | ....................... | F01D 1/36 415/90 |
| 2005/0276681 A1* | 12/2005 | Avina | ....................... | F01D 1/36 415/1 |
| 2013/0039744 A1* | 2/2013 | Woody | .................... | F04D 23/00 416/223 R |

* cited by examiner

*Primary Examiner* — Steven M Sutherland
(74) *Attorney, Agent, or Firm* — Donald R. Boys; Central Coast Patent Agency LLC

(57) ABSTRACT

A boundary layer turbine (BLT) engine has a housing formed by an outer cylinder a first and a second faceplate, a turbine shaft through the faceplates, a stack of alternating disks and spacers with central holes joined to the turbine shaft leaving an outer combustion zone, an air inlet through the first faceplate, an exhaust port through the second faceplate, a fuel port through the outer cylinder, and an ignition device communicating with the combustion zone. The disks and spacers have openings forming separate intake and exhaust channels parallel to the turbine shaft, one channel channeling air from the air inlet port to spaces between disks, and the other channel channeling exhaust from the combustion zone through the exhaust channel to the exhaust port. Fuel is injected into the combustion zone, the air fuel mixture is ignited, and exhaust products impart torque to the turbine shaft by boundary layer friction.

20 Claims, 11 Drawing Sheets

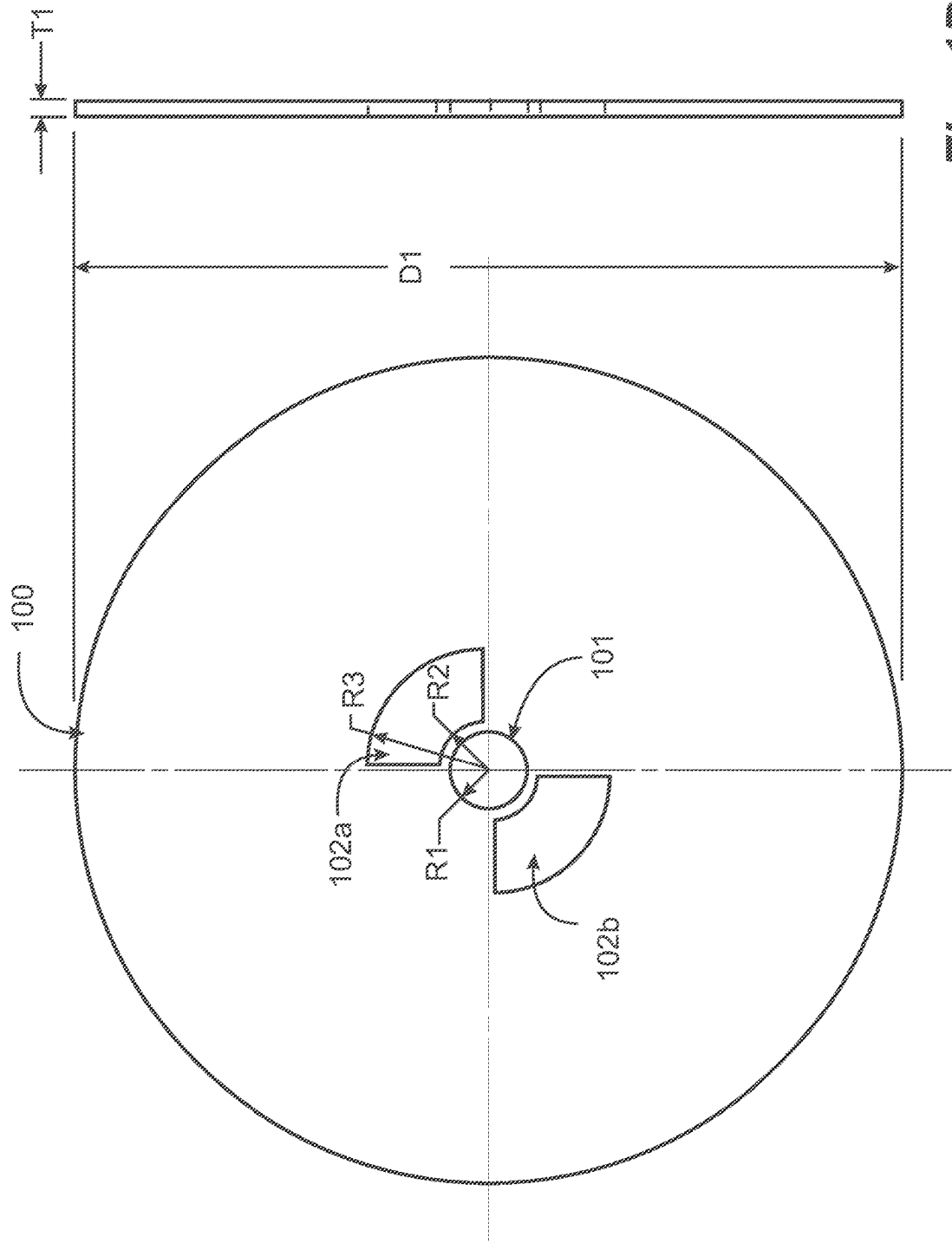

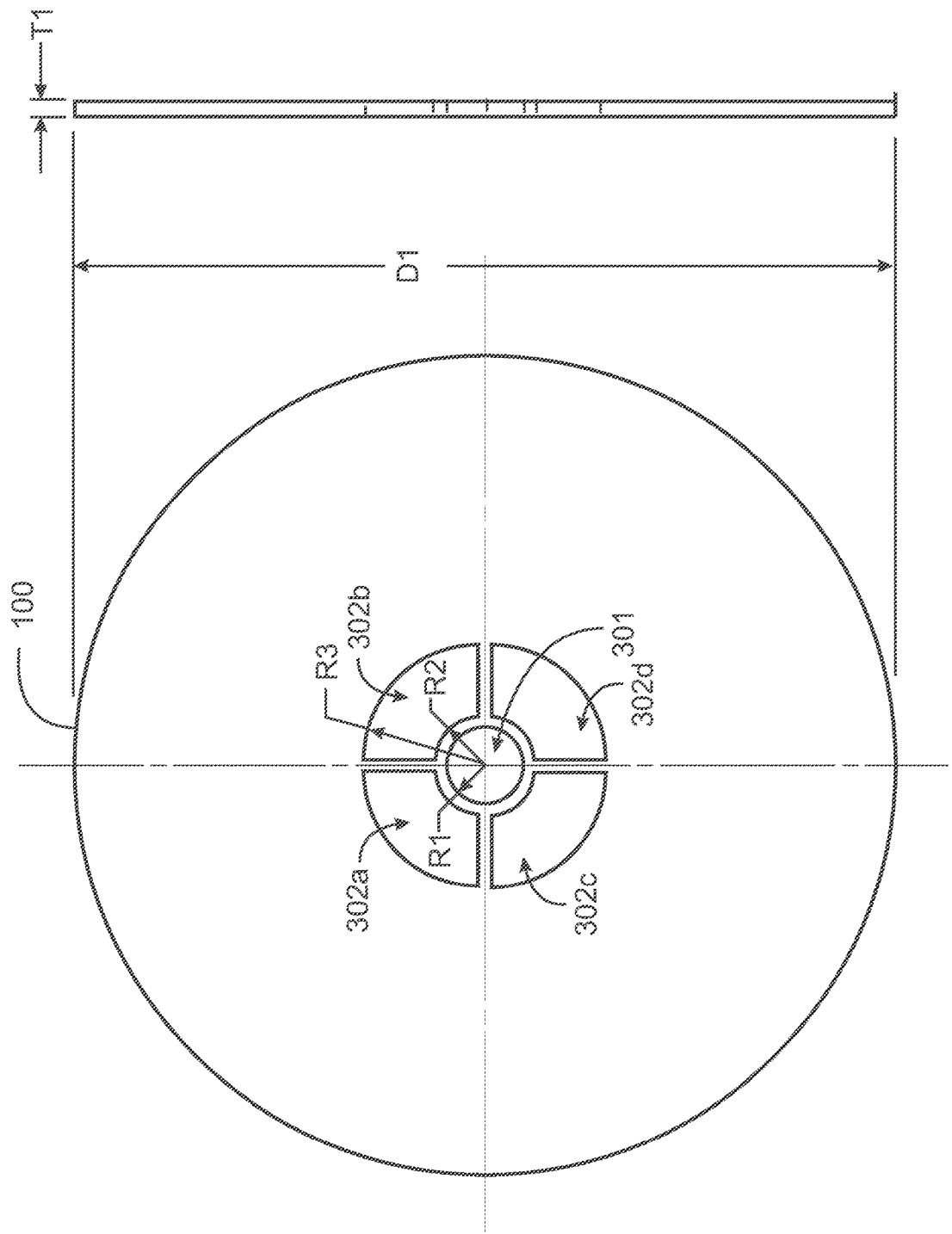

| Ranking: 5 = best to 1 = worst | | Rank | | Rank | | Rank | | Rank | | Rank | |
|---|---|---|---|---|---|---|---|---|---|---|---|
| Score | | 20.5 | | 37.5 | | 31 | | 27 | | 34 | |
| Material: | Silicon | Rank | Silicon Carbide (SiC) | Rank | Silicon Nitride (Si3N4) | Rank | Nickel | Rank | Inconel 625 | Rank |
| Property | (Si) | | | | | | (Ni) | | (Fe alloy) | |
| Melting point (deg. K) | 1680 | 2 | 3100 | 5 | 2173 | 4 | 1728 | 3 | 1587 | 1 |
| Max. operating temp. (deg. K) | 850 | 2 | 970 | 4 | 1070 | 5 | 640 | 1 | 920 | 3 |
| Density (gr/cm3) | 2.33 | 5 | 3.1 | 4 | 3.29 | 3 | 8.88 | 1 | 8.44 | 2 |
| Fracture toughness (MPam0.5) | 0.9 | 1 | 120 | 3 | 6.5 | 2 | 150 | 4 | 185 | 5 |
| Thermal Conductivity (W/mK) | 20.9 | 2.5 | 20.7 | 2.5 | 15 | 1 | 60.7 | 5 | 24 | 4 |
| Coef. Therm. Expan. (x 10^6) | 4.44 | 3 | 4 | 4 | 3.3 | 5 | 17 | 1 | 16.2 | 2 |
| Elastic mod. (Youngs, GPa) | 112 | 1 | 130 | 2 | 180 | 3 | 207 | 4 | 221 | 5 |
| Heat capacity (J/grK) | 0.7 | 2 | 0.6 | 3 | 1.1 | 1 | 0.46 | 4 | 0.41 | 5 |
| Tensile Strength (yield, MPa) | 180 | 1 | 500 | 5 | 390 | 3 | 345 | 2 | 430 | 4 |
| Shear mod. (GPa) | 63 | 1 | 510 | 5 | 100 | 4 | 79 | 2 | 81 | 3 |

Fig. 7

| Exhaust Temp. (K) | Est. Max. Carnot Eff. | Estimated, overall system efficiency assuming BLT efficiency of | | |
|---|---|---|---|---|
| | | 40% | 68% | 95% |
| 900 | 58.14% | 22.1% | 37.6% | 52.5% |
| 850 | 60.47% | 23.0% | 39.1% | 54.6% |
| 800 | 62.79% | 23.9% | 40.6% | 56.7% |
| 750 | 65.12% | 24.7% | 42.1% | 58.8% |
| 700 | 67.44% | 25.6% | 43.6% | 60.9% |
| 650 | 69.77% | 26.5% | 45.1% | 63.0% |
| 600 | 72.09% | 27.4% | 46.6% | 65.1% |
| 550 | 74.42% | 28.3% | 48.1% | 67.2% |
| 500 | 76.74% | 29.2% | 49.6% | 69.3% |
| 450 | 79.07% | 30.0% | 51.1% | 71.4% |
| 400 | 81.40% | 30.9% | 52.6% | 73.5% |
| 350 | 83.72% | 31.8% | 54.1% | 75.6% |
| 300 | 86.05% | 32.7% | 55.6% | 77.7% |

Fig. 8

| RPM Radius (m) | 6000 | 8000 | 12000 | 18000 | 24000 |
|---|---|---|---|---|---|
| 0.045 | 1.00465 | 1.00829 | 1.01874 | 1.04267 | 1.07711 |
| 0.05 | 1.00575 | 1.01024 | 1.02319 | 1.05294 | 1.09604 |
| 0.06 | 1.00829 | 1.01478 | 1.03356 | 1.07711 | 1.14117 |
| 0.07 | 1.01130 | 1.02017 | 1.04596 | 1.10639 | 1.19690 |
| 0.08 | 1.01478 | 1.02643 | 1.06045 | 1.14117 | 1.26460 |
| 0.09 | 1.01874 | 1.03356 | 1.07711 | 1.18191 | 1.34597 |
| 0.1 | 1.02319 | 1.04160 | 1.09604 | 1.22916 | 1.44313 |
| 0.11 | 1.02813 | 1.05055 | 1.11735 | 1.28359 | 1.55868 |
| 0.12 | 1.03356 | 1.06045 | 1.14117 | 1.34597 | 1.69589 |
| 0.13 | 1.03950 | 1.07131 | 1.16763 | 1.41722 | 1.85876 |
| 0.14 | 1.04596 | 1.08316 | 1.19690 | 1.49842 | 2.05228 |
| 0.15 | 1.05294 | 1.09604 | 1.22916 | 1.59081 | 2.28262 |
| 0.16 | 1.06045 | 1.10997 | 1.26460 | 1.69589 | 2.55752 |

Calculated assuming T = 300K amd Mi = 28.97 AMU

*Fig. 9*

| Radius (m) \ RPM | 6000 | 8000 | 12000 | 18000 | 24000 |
|---|---|---|---|---|---|
| 0.045 | 1.00071 | 1.00125 | 1.00282 | 1.00636 | 1.01134 |
| 0.05 | 1.00087 | 1.00155 | 1.00349 | 1.00786 | 1.01402 |
| 0.06 | 1.00125 | 1.00223 | 1.00502 | 1.01134 | 1.02025 |
| 0.07 | 1.00171 | 1.00304 | 1.00685 | 1.01547 | 1.02766 |
| 0.08 | 1.00223 | 1.00397 | 1.00895 | 1.02025 | 1.03628 |
| 0.09 | 1.00282 | 1.00502 | 1.01134 | 1.02570 | 1.04614 |
| 0.1 | 1.00349 | 1.00621 | 1.01402 | 1.03182 | 1.05727 |
| 0.11 | 1.00422 | 1.00752 | 1.01699 | 1.03863 | 1.06970 |
| 0.12 | 1.00502 | 1.00895 | 1.02025 | 1.04614 | 1.08349 |
| 0.13 | 1.00590 | 1.01051 | 1.02381 | 1.05436 | 1.09868 |
| 0.14 | 1.00685 | 1.01220 | 1.02766 | 1.06332 | 1.11533 |
| 0.15 | 1.00786 | 1.01402 | 1.03182 | 1.07302 | 1.13349 |
| 0.16 | 1.00895 | 1.01597 | 1.03628 | 1.08349 | 1.15322 |

Calculated assuming T = 2150 K and Mi = 31.52 AMU

*Fig. 10*

BOUNDAY LAYER TURBINE

CROSS-REFERENCE TO RELATED APPLICATIONS

The instant application claims priority to Provisional Patent Application (PPA) 63/025,714 filed May 15, 2020. All disclosure of the parent case is incorporated at least by reference.

BACKGROUND OF THE INVENTION

1. Field of the Invention

The present invention is in the technical area of gas turbine engines and pertains more particularly to an improved boundary layer gas turbine engine.

2. Description of Related Art

Boundary layer gas turbine engines have long been known in the art, as evidenced by, for example by U.S. Pat. No. 3,007,311 issued to Robert C. Amero on Nov. 7, 1961. The turbine taught in the Amero patent achieves porting of gas flow by mounting specially shaped couplers on the turbine axle that create four channels that run parallel to the axle. The disks are created with diametrically opposed protrusions from one face of the disk that occlude one set of channels or the other set. The couplers are constructed with end plates that occlude either the proximal end of the exhaust channels or the distal end of the intake channels.

In the Amero teaching, the disks are stacked up such that the diametrically opposed protrusions alternate which set of channels are occluded. The couplers are inserted into each end of the disk stack and, when mounted on the axle, the couplers also serve to compress the disk stack.

The inventor believes there is a better way to accomplish the porting to provide a more efficient and more powerful turbine engine.

BRIEF SUMMARY OF THE INVENTION

In one embodiment of the invention a boundary layer turbine (BLT) engine is provided, comprising a housing formed by an outer cylinder having an inside diameter and a first and a second faceplate joined to opposite sides of the outer cylinder, a turbine shaft passing centrally through the two faceplates, a stack of alternating disks and spacers with central holes, the disks and spacers joined to the turbine shaft through the central holes, the disks having a common diameter less than the inside diameter of the outer cylinder and the spacers having a common diameter less than the common diameter of the disks, leaving a cylindrical space outside the disk stack and inside the outer cylinder as a combustion zone, an air inlet port through the first faceplate, an exhaust port through the second faceplate, a fuel port through the outer cylinder, and an ignition device communicating with the combustion zone. The disks and spacers have openings proximate the central hole such that two separate channels are formed through the disk and spacer stack parallel to the turbine shaft, one channel channeling air from the air inlet port to alternating spaces between disks such that channeled incoming air travels outward between disks to the combustion zone, and the other channel channeling exhaust from the combustion zone, the exhaust traveling inward from the combustion zone in alternating spaces between disks other than the alternating spaces carrying air to the combustion zone, and thence through the exhaust channel to the exhaust port, wherein fuel is injected into incoming air in the combustion zone, the air fuel mixture is ignited, and exhaust products expand inward between disks imparting torque to the turbine shaft by boundary layer friction.

In one embodiment the disks and spacers are alternated in the stack with and odd number of disks and an even number of spacers, the stack having a disk at each end, the disks and spacers are intimately adjacent in the stack, the disks and spacers are oriented in a specific way relative to the turbine shaft and are rotationally fixed relative to the turbine shaft. Also, in one embodiment the disks and spacers are formed from solid disks of silicon-based material. In one embodiment the silicon-based material is one of Si, SiC, or Si3N4. And in one embodiment there are 21 disks and 20 spacers with a common thickness of 0.029 inch.

In one embodiment the ignition device is a platinized surface in the combustion zone. Also, in one embodiment the ignition device comprises a light-emitting diode (LED). Also, in one embodiment one end of the turbine shaft has an interface to a shaft of a starter motor, wherein the starter motor spins the turbine shaft up to a desired starting RPM, air is introduced, fuel is introduced, and ignition is commenced to start the BLT. In one embodiment pressurized air is fed to the air inlet port. And in one embodiment the spacers between disks channeling intake air to the combustion zone have a lesser thickness than the spacers between disks providing exhaust channeling.

In another aspect of the invention a method for implementing a boundary layer turbine (BLT) engine is provided, comprising forming a housing by an outer cylinder having an inside diameter and a first and a second faceplate joined to opposite sides of the outer cylinder, passing a turbine shaft centrally through the two faceplates, providing an air inlet port through the first faceplate, providing an exhaust port through the second faceplate, joining a stack of alternating disks and spacers with central holes to the turbine shaft through the central holes, the disks having a common diameter less than the inside diameter of the outer cylinder and the spacers having a common diameter less than the common diameter of the disks, leaving a cylindrical space outside the disk stack and inside the outer cylinder as a combustion zone, the disks and spacers have openings proximate the central hole such that two separate channels are formed through the disk and spacer stack parallel to the turbine shaft, one channel channeling air from the air inlet port to alternating spaces between disks such that channeled incoming air travels outward between disks to the combustion zone, and the other channel channeling exhaust from the combustion zone, the exhaust traveling inward from the combustion zone in alternating spaces between disks other than the alternating spaces carrying air to the combustion zone, and thence through the exhaust channel to the exhaust port, providing a fuel port through the outer cylinder, communicating an ignition device with the combustion zone, injecting fuel into incoming air in the combustion zone, igniting the fuel air mixture, and providing torque to the turbine shaft by boundary layer friction between the exhaust gases and disk surfaces.

In one embodiment the method comprises alternating the disks and spacers in the stack with and odd number of disks and an even number of spacers, the stack having a disk at each end, the disks and spacers intimately adjacent in the stack, the disks and spacers oriented in a specific way relative to the turbine shaft and rotationally fixed relative to the turbine shaft. Also, in one embodiment the method comprises forming the disks and spacers from solid disks of silicon-based material. Also, in one embodiment the method comprises forming the disks from one of Si, SiC, or Si3N4. And in one embodiment the method comprises making the number of disks 21 and of spacers 20 with a common thickness of 0.029 inch.

In one embodiment the method comprises using a platinized surface in the combustion zone as the ignition device. Also, in one embodiment the method comprises using a light-emitting diode (LED) as the ignition device. Also, in one embodiment the method comprises starting the BLT by spinning the turbine shaft and disk stack by a starter motor interfaced to the turbine shaft up to a desired starting RPM, introducing air at the air intake port, introducing fuel at the fuel port, and igniting the fuel air mixture to start the BLT. In one embodiment the method comprises feeding pressurized air to the air inlet port. And in one embodiment the method comprises making the spacers between disks channeling intake air to the combustion zone of a lesser thickness than the spacers between disks providing exhaust channeling.

BRIEF DESCRIPTION OF THE SEVERAL VIEWS OF THE DRAWINGS

FIG. 1A is a face-on view of an end disk in an embodiment of the present invention.

FIG. 1B is a side elevation view of the disk of FIG. 1A.

FIG. 3A is face-on view of an internal disk in an embodiment of the invention.

FIG. 3B is a side elevation view of the disk of FIG. 3A.

FIG. 7 is a table illustrating characteristics of different types of silicon materials.

FIG. 8 is a table showing efficiency at different exhaust temperatures.

FIG. 9 is a table relating exhaust chamber pressure to disk radius and RPM, calculations based on gas temperature of 300 K at periphery of disk stack.

FIG. 10 is a second table relating exhaust chamber pressure to disk radius and RPM, calculations based on gas temperature of 2150 K at periphery of disk stack.

DETAILED DESCRIPTION OF THE INVENTION

Figures 2A, 2B:
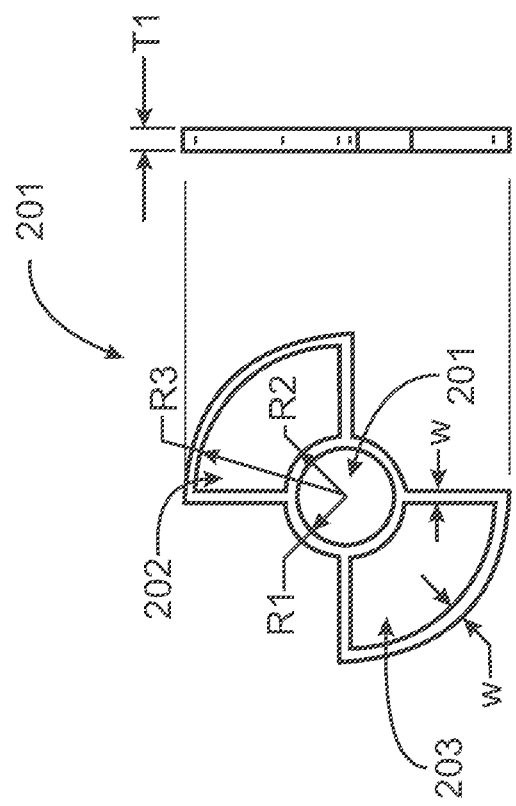
FIG. 2A is a face-on view of a spacer in an embodiment of the invention.
FIG. 2B is a side elevation view of the spacer of FIG. 2A.

U.S. Pat. No. 300,731, hereinafter Amero, is incorporated by reference with the instant application to enable a person of skill to understand the teachings of Amero, and to compare Amero to the improvements described in this specification. Amero is also provided in this application by information disclosure statement (IDS).

Amero is a patent for a boundary layer turbine (BLT) that permits axial gas flow; i.e. air comes in one end of a disk-rotor stack and exhaust gases exit the other end of the disk-rotor stack. Inside the disk-rotor stack, the porting between the disks channels air flow radially outward, in one set of inter-disk spaces. Friction between the rotating disk surfaces and the intake air speeds up the bulk-air velocity and impels it centrifugally outward. Once the air reaches the rotor housing, it is combined with fuel and combustion takes place. The resulting combustion gases exit the combustion area by traveling radially inward, via another set of inter-disk spaces. As the heated exhaust gases travel inward, the friction of the heated gases against rotating disk surfaces imparts mechanical energy to the disk stack.

The porting along Amero's rotor axle alternates the inter-disk spaces for air inlet with the inter-disk spaces for exhaust outlet. In such an arrangement, each disk has a cold side and a hot side. Energy imparted by the heated exhaust gas, onto the hot side of each disk, is used in three ways: 1) providing useful work that is taken out through the rotor axle; 2) speeding up the bulk velocity of the cold intake air that is in contact with the cold side of that disk while also slowing the bulk velocity of the hot exhaust gases in contact with the hot side of that disk; and 3) thermal heating, via conduction and convection, of the cold intake air that is in contact with the cold side of that disk while cooling the hot exhaust gases in contact with the hot side of that disk.

In an embodiment of the present invention an alternative approach to Amero provides a novel and improved rotor disk stack construction. Amero achieves porting of gas flow by mounting an assembly of two specially shaped couplers on the turbine axle creating four channels that run parallel to the axle. The metal disks in Amero mount to the outside diameter of the assembled couplers, and the metal disks have diametrically opposed protrusions from one face of the disk that occlude one set of channels on the couplers. The couplers are constructed with end plates that occlude either the proximal end of the exhaust channels or the distal end of the intake channels, where proximal denotes the intake side of the rotor disk stack and distal denotes the exhaust side of the rotor disk stack.

The disks are stacked in Amero such that the diametrically opposed protrusions alternate which set of channels are occluded. The couplers are inserted into each end of the disk stack and, when mounted on the axle, the couplers also serve to compress the disk stack.

In an embodiment of the present invention alternating disks and spacers assemble directly to the turbine shaft without the assembled couplers taught in Amero. Intake and exhaust channels in the instant invention are provided by specially shaped lateral openings through the disks, proximate the turbine shaft. Each disk and each spacer has holes that recreate the channels that Amero creates by using couplers. Imagine Amero's assembled stack of disks and couplers, absent the axle, as a single solid piece, the proposed improvement involves taking thin radial slices of that solid.

FIGS. 1A and 1B illustrate a disk 100 in an embodiment of the invention having openings 102a and 102b that are a part of either the intake or the exhaust channels which are formed when disks and spacers of the instant invention are assembled on the turbine shaft, which assembly is described in enabling detail below. Openings 102a and 102b in disk 100 are identical in shape and size but are implemented diametrically opposite a central opening 101 of a radius R1 equal to the radius of the turbine shaft. Openings 102a and 102b have an outer radius R3 and an inner radius R2 and each has a radial extent of 90 degrees.

FIG. 1B is a side view of the disk of FIG. 1A showing thickness T1, which may vary considerably in different embodiments of the invention but is typically the same as the thickness of other disks and spacers in the stack.

FIGS. 2A and 2B illustrate a spacer 201 that is used between disks in a disk stack on the turbine shaft in an embodiment of the invention. Spacer 201 has openings 202 and 203 which are the same size, shape and orientation of openings 102a and 102b of disk 100. Central opening 201 is the same as opening 101 in FIG. 1. The spacer is formed with walls of equal thickness w, and the thickness T1 is the same as the disk of FIGS. 1A and 1B.

FIGS. 3A and 3B illustrate another disk 301 which has four openings 302a, 302b, 302c and 302d. These openings are of the size and shape of the openings in the disk of FIGS. 1a and 1B, and the spacer of FIGS. 2A and 2B. Disks according to FIGS. 3A and 3B are termed internal disks in a stack in embodiments of the invention.

Figure 4:
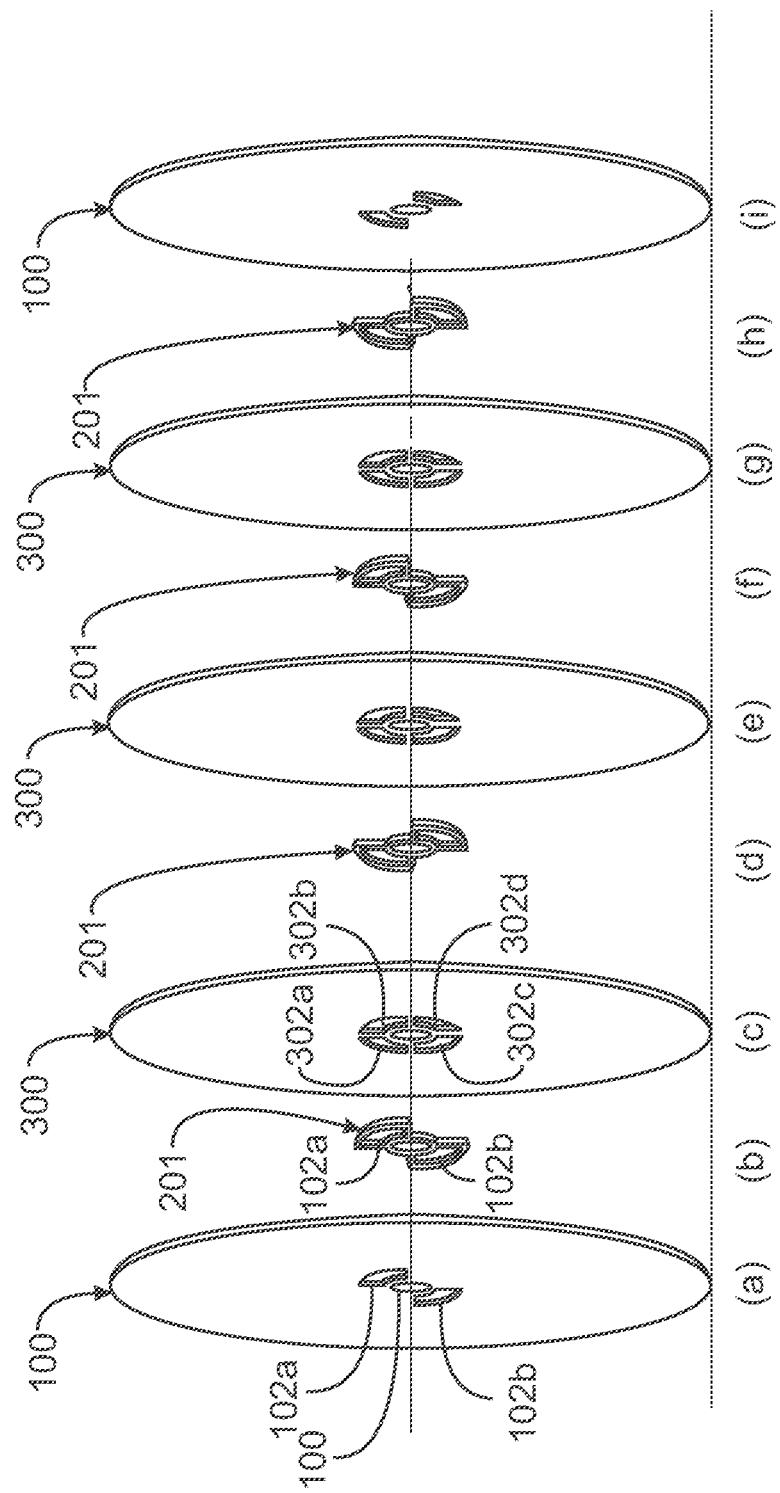
FIG. 4 illustrates a stack of disk in a sequential order in an embodiment of the invention.

FIG. 4 illustrates a stacking arrangement of disks and spacers in an embodiment of the invention. Beginning on the left a first disk in the stack at position (a) is an end disk 100 according to FIGS. 1A and 1B, having two channel openings 102a and 102b. Next in the stack at position (b) is a spacer 201 oriented such that the spacer openings 102a and 102b align with those of end disk 100. Next is an internal disk 300 which has four openings 302a, 302b, 302c and 302d, spaced on ninety-degree increments, with two of the openings 302b and 302c aligned with the openings of the previous spacer 201 and the openings of end disk 100.

Proceeding to the right spacers 201 and internal disks 300 are alternated as shown with alternate spacers rotated ninety degrees around the turbine shaft, until a last disk on the right is an end disk 100 rotated ninety degrees relative to end disk 100 at the beginning of the stack.

The number of and positioning of the spacers and disks creates channels such that air coming from the left follows an inlet channel and flows outward between alternate disks, and combustion gases produced by combustion flow inward between other alternative disks to an exhaust channel that exits in a chamber to the right.

Figure 5:
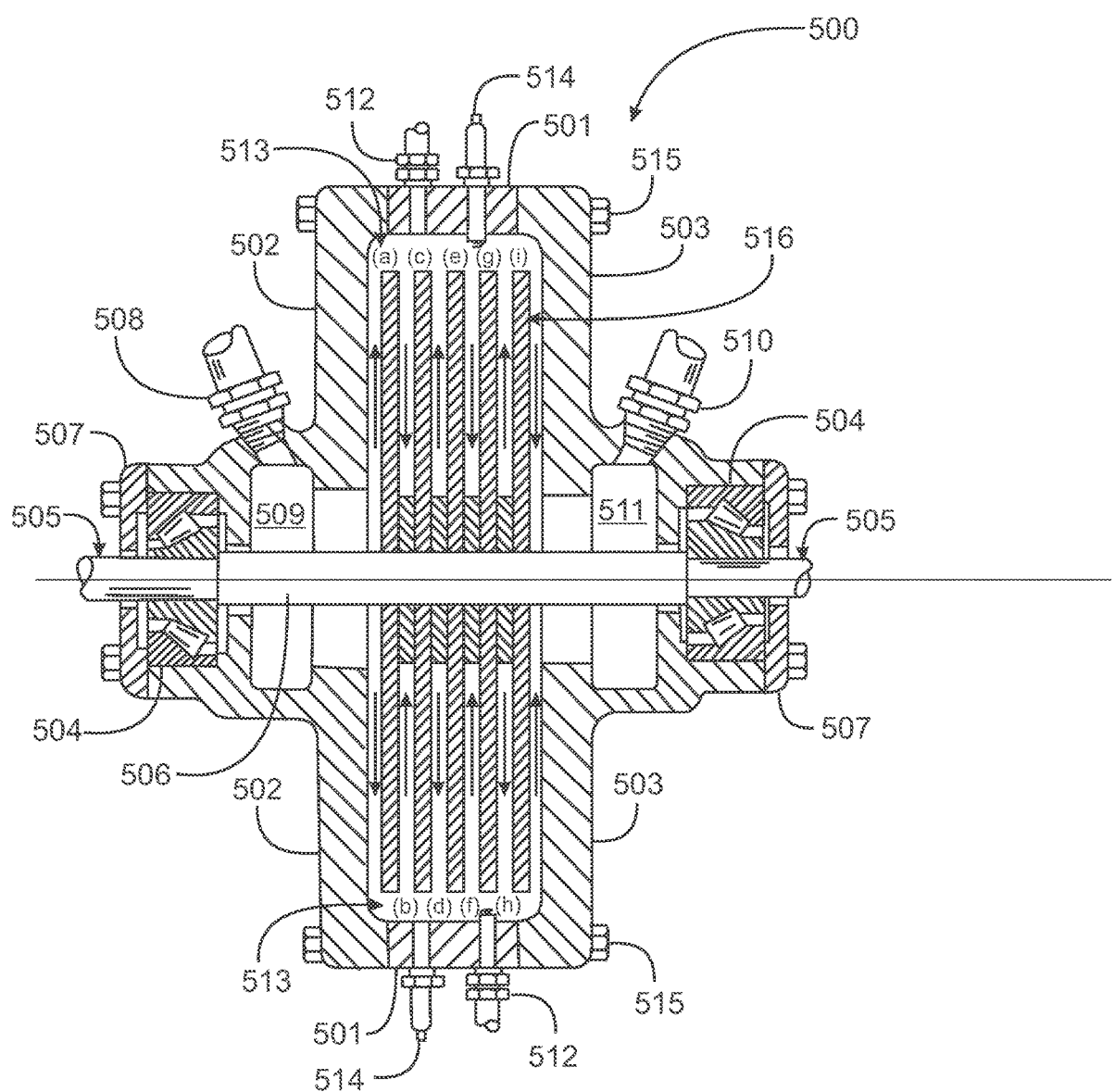
FIG. 5 is a section view of a boundary layer turbine in an embodiment of the invention.

FIG. 5 is a cross section of a BLT 500 in an embodiment of the present invention with alternating disks and spacers as shown in FIG. 4. A housing is formed by an outer cylinder 501, and face plates 502 and 503. The face plates are secured intimately with the outer cylinder 501 by conventional fasteners 515 in this example. Not all fasteners are numbered in FIG. 5.

Face plate 502 is formed to provide in air inlet region 509 into which an air supply is provided through an inlet fitting 508 from an air supply. There is further a mounting bore for a roller bearing 504 in this example, the bearing secured by a cap plate 507. Face plate 503 is formed to provide an exhaust region 511 with an exhaust line provided through a fitting 510. There is another mounting bore for a second journal bearing 504 on the exhaust side, the bearing secured by another cap plate 507.

Turbine shaft 505 passes through the BLT and is carried by the roller bearings. Shaft 505 has a diameter on each end for the inside diameter of the bearings, and a central region 506 of a larger diameter between the smaller diameter end regions, such that there are shoulders against the bearings. The central dimeter of the turbine shaft is the diameter of the holes 100 in the disks and spacers as shown in FIG. 4.

A disk stack 516 is carried on the turbine shaft in this example and centered between face plates 502 and 503. The disks and spacers in the stack are labeled (a) through (i) and are the same disks and spacers shown in FIG. 4 with the same labels.

It is very important for the various disks and spacers to remain in a specific alignment relative to one other. However, there is no need for the entire rotor disk stack to remain in any particular orientation to the turbine shaft. Classic methods can be used to maintain disk and spacer alignment, either a flat area on the shaft that matches a flat area in the center hole of each disk and spacer, or a keyway cut in the shaft and into each disk and spacer, with a key in the keyway and the disks and spacers assembled over the key. Alternatively, the disks and spacers may be assembled in the desired arrangement and alignment and the entire assembly might then be brazed, welded, glued or pinned together to form a single unit. This finished rotor disk stack may then be press fit onto the shaft, or over a key in the shaft.

With disk stack 516 centered on the shaft the stack is free to rotate in either rotary direction. Air may be provided under pressure through fitting 508 into region 509, and the air will flow outward between face plate 502 and disk (a), between disk (c) and (e), and between disk (g) and (i). Fuel is introduced in this example through fittings 512, which may be spaced around the outside diameter of cylinder 501, and the fuel/air mixture is ignited by a spark plug 514, which may be needed only for an initial period, and the combustion may then be maintained.

Exhaust products of combustion expand inward between disks (a) and (c), disks (e) and (g) and between disk (i) and face plate 503. The expanding exhaust gases pass through a channel created by the openings in the disks and spacers of the stack into region 511 and exit through exhaust fitting 510.

The turbine may be started by spinning shaft 505 in either rotary direction while providing air and fuel and initiating combustion. With the turbine in operation air between disks is compressed outward to the combustion region by boundary layer friction between the disk faces and the air. Expanding exhaust products impart torque to the shaft by virtue of boundary layer friction between opposing disk faces and the exhaust products.

FIG. 5 is not an optimum design for a boundary layer turbine according to embodiments of the invention but is produced and described to teach principles and fundamentals of the invention.

Figure 6A:
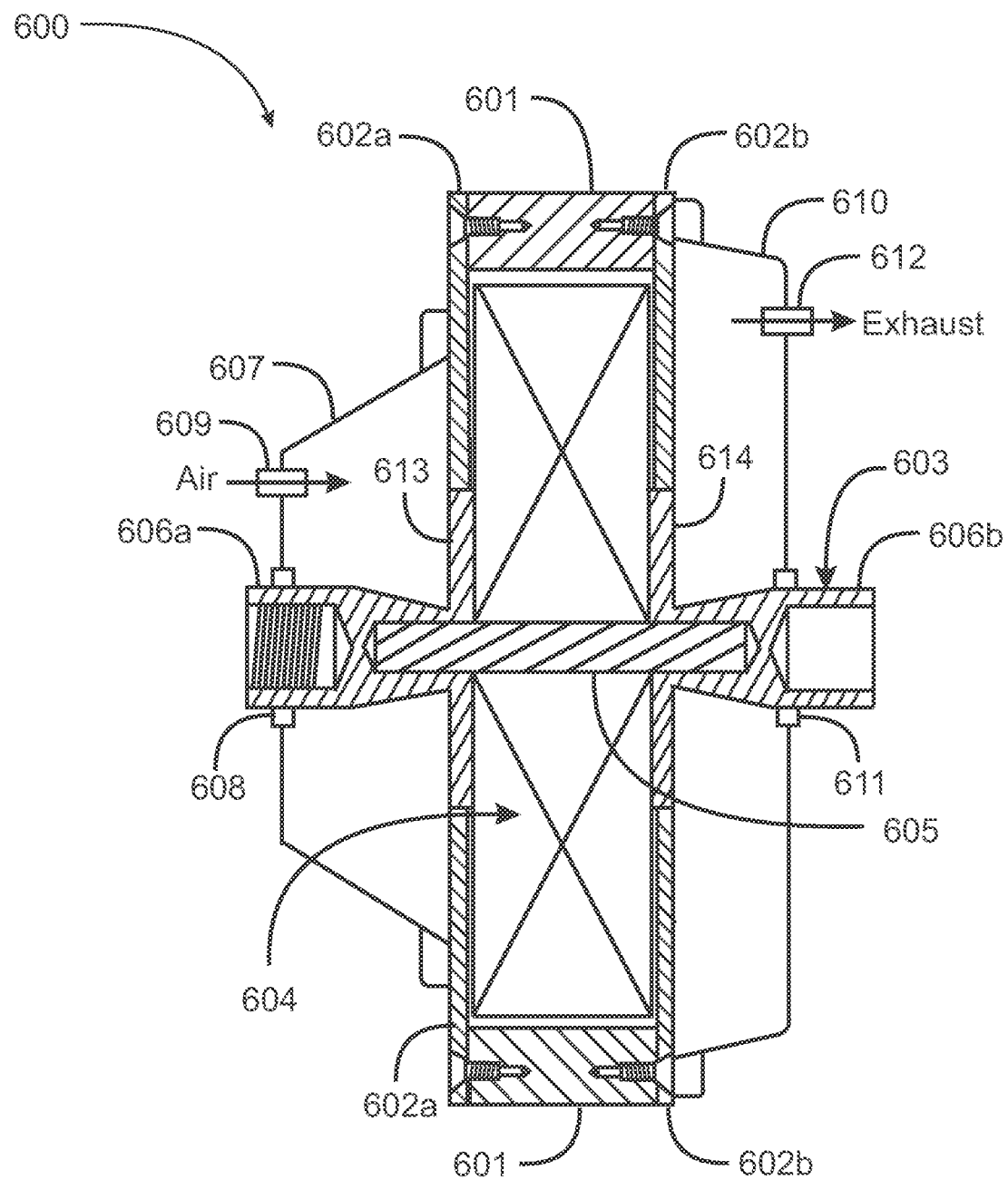
FIG. 6A is a section view of a boundary layer turbine in another embodiment of the invention.
Figure 6B:
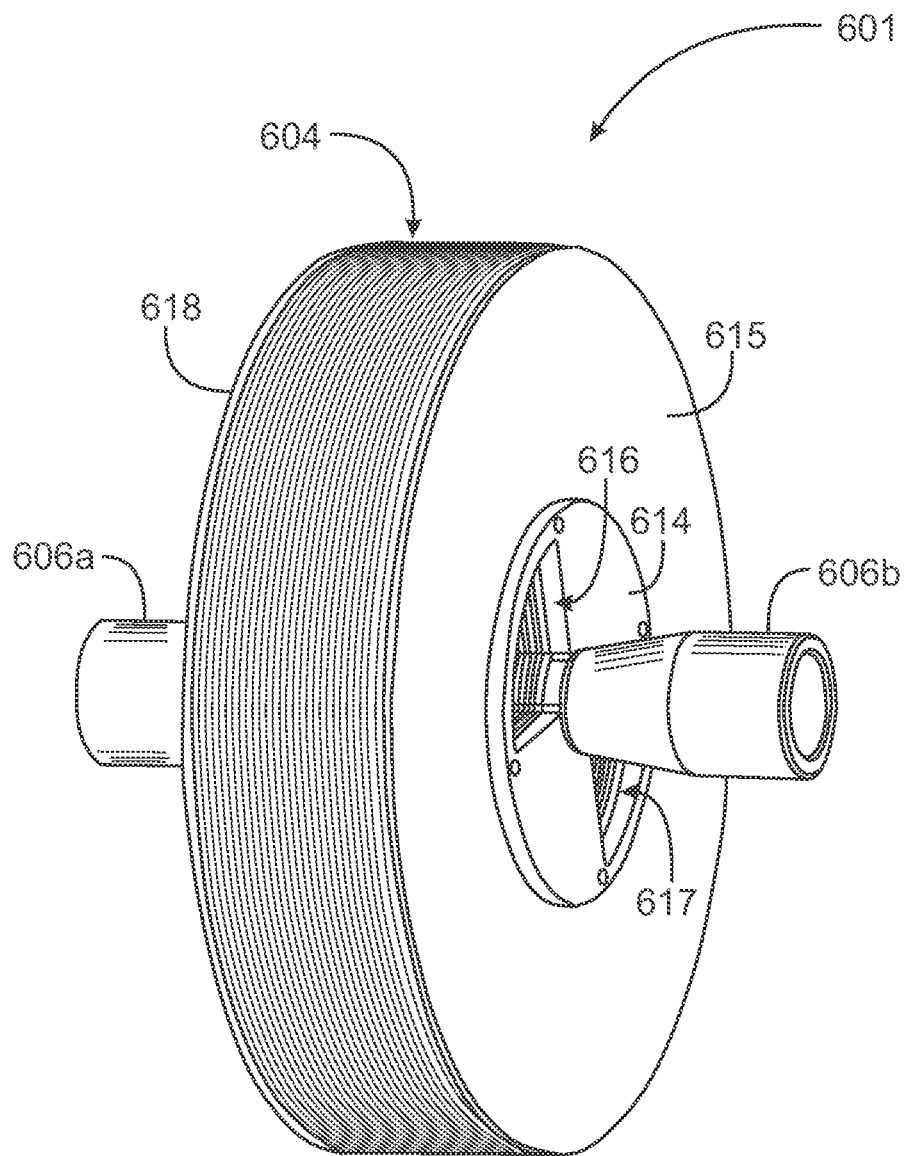
FIG. 6B is a perspective view of a disk stack assembly for the turbine of FIG. 6A.

FIGS. 6A and 6B illustrate an alternative embodiment of the invention in which single crystal disks of silicon-based materials such as Si, SiC, or Si3N4 are used for the disks and spacers in a BLT 600 according to embodiments of the invention. Such disks are readily available from manufacturers of silicon disks in the semiconductor industry. Further, Si based components are less complex to machine than metal components as may be used in the BLT disclosed by Amero.

In BLT 600 as shown in FIG. 6A a disk region is formed by a cylinder 601 and end plates 602a and 602b, similar to the structure in FIG. 5. A disk stack 604 is preassembled on a rotor shaft 605 in an assembly 603 which includes intake end coupler 606a and an exhaust end coupler 606b, which each interface with shaft 605. Assembly 603 is illustrated in FIG. 6B and described below in enabling detail. In particular, the end couplers each have two ports to permit entry of intake air or exhaust of combustion gases and, as such, permit all the disks in the disk stack to be identical to the internal disks described in FIG. 3.

An air inlet region is provided by a sheet metal cover 607 which seals to faceplate 602a and has a wiping seal 608 withing which coupler 606a turns. Air enters the inlet region via a passage 609 from an external air supply. Passage 609 is representative of a variety of inlet passages that might be used and might interface in a variety of ways. Air passes from the inlet region through lateral openings in end plate portion 613 which is integral with end coupler 606a.

As exhaust region is provided by a sheet metal cover 610 which seals to faceplate 602*b* and has a wiping seal 611 within which coupler 606*b* turns. Exhaust enters the exhaust region from combustion products passing inward between disks in the disk stack, imparting torque to the shaft by boundary layer friction between the combustion products and the surfaces of disks, and through an exhaust channel formed by lateral openings in the disks and spacers, and through openings in end plate portion 614 into the exhaust region. Exhaust products exit by an exhaust passage 612, which is representative of a variety of exhaust passages that might be used and might interface in a variety of ways. FIG. 6B is a perspective view of the preassembled disk stack 601, which includes end couplings 606*a* and 606*b*, end plates 613 and 614, shaft 605 (not seen in this view), and the disks 604 interspaced with spacers. The disks include a left end disk 618 and a right end disk 615. End plate 614 has openings 616 and 617 which align with openings in the disks and spacers to form the exhaust channel laterally through the disk stack. End plate 613 is not seen in this view but has openings similar to openings 616 and 617 to align with opening in the disks and spacers to form the inlet channel through the disks and spacers.

Face plates 602*a* and 602*b* each have a central opening with a common diameter and end plates 613 and 614 fit into the central openings in face plates 602*a* and 602*b*. The central opening in the face plates is overall, in this example, 0.020 inches larger than the outer diameter of the end plates, so the gap between the two is 0.010 inches. This difference forms a gap that effectively limits air from inlet region from passing into the disk region along the outside of the end disks and the inside of the face plates.

In this example the dimension between face plates inside the disk region is ca. 1.2 inches, there are 21 disks and 20 spacers, the disk and spacer thicknesses are each 0.029 inches. This number and spacing provides 10 inter-disk spacers of 0.029 inch width for air to travel outward to a combustion region at the outer diameter of the disks, and 10 similar inter-disk spaces for combustion products to travel inward to the lateral exhaust channel, providing torque to the shaft by boundary layer friction.

Combustion may be initiated in the combustion region by one or more spark plugs as described above for the embodiment illustrate by FIG. 5. In other circumstances and embodiments combustion may be implemented in other ways as described below. Fuel may be provided through ports around the outer cylinder as well, as shown in the embodiment of FIG. 5.

A person of ordinary skill in the art will understand that the number of disks and the thickness and spacing may be different in other embodiments of the invention.

It will be clear to the skilled person that the apparatus as thus far described with reference to FIGS. 6A and 6B has no bearings to support assembly 603 in a manner that the element relationships may be maintained. Bearings to accomplish this purpose must necessarily be supported by the structure of cylinder 601 and face plates 602*a* and 602*b*, with assembly 603 supported by the inner bearing races. There exist a variety of mechanical circumstance by which such a set of bearings may be implemented.

In another variation end couplers 606*a* and 606*b* interface with a starter motor on one end and a dynamometer on the other, both of which have shafts supported by bearings, and the starter motor, the dynamometer and the structure of the BLT are all supported on a common framework, which makes the necessity of a separate set of bearings for the BLT moot.

Amero discloses the rotor and housing as a closed system; thus, the only possible direction of flow for gas entering at the proximal end of the rotor disk stack is for the incoming gas to flow radially outward. Likewise, the only possible direction of flow for gas at the distal end of the rotor disk stack is for hot gas at the disk periphery to flow radially inward. As such is the case, the gap between the rotor housing and the proximal end of the disk stack constitutes one of channels for the flow of intake air and the gap between the rotor housing and the distal end of the rotor stack constitutes one of the channels for the flow of exhaust gas. There is no compelling need to obstruct these gas flows for a BLT according to embodiments as illustrated in FIG. 5.

As the number of disks in a stack grows, the proportion of the total flow passing through proximal and distal gaps, between the housing and the rotor disk stack, decreases. Amero has only 5 disks and 6 channels for gas flow, three for intake air in and three for exhaust gases out. As such, the proportion of flow through the gaps, between the rotor disk stack and the rotor housing, would represent ca. 33% of the flow for incoming and exhausting gas flows. As is discussed below, boundary layer turbines have greater turbine efficiency with a large number of closely spaced disks. A more desirable configuration, for a boundary layer turbine, would have somewhere between 20 and 40 disks. In that range, the proportion of total flow through the gaps would represent 10% to 5% of the flow for either the incoming or the exhausting gas flows. Thus, even if the flow in the end of stack gaps was distinctly different than equivalent flows between disk faces, this flow would represent only a small portion of the overall flow and, again, there would be no compelling reason for obstructing that flow, as is done in Amero. Further, the flow obstruction taught by Amero represents added complexity and construction costs without providing a compelling operational benefit.

Amero teaches the use of multiple spark igniters spaced around the circumference of the rotor chamber. As is discussed more thoroughly below, boundary layer turbines work better a higher RPMs; with the upper limit being a rotor-edge speed approaching the speed of sound in the gas mixture that is being combusted in the turbine. At higher RPM, using more ports than absolutely necessary will induce more turbulence in the gas at the periphery of the rotor chamber. Nearer the speed of sound in the gas mixture, there is a risk of creating standing shockwaves that could be detrimental to the rotor stack. At higher RPMs, the one-circuit transit time for a point on the rotor becomes increasingly small. For example, a desirable rotor speed would be 24,000 rpm or 400 revolutions per second, which converts to one revolution every 2.5 milliseconds. Thus, the ignition event, created by a spark igniter, will occur over a long stretch of the rotor chamber periphery. If other methods of ignition are used, igniter ports might may not be needed at all.

As described previously, there may be no need for more than one fuel inlet at the rotor chamber periphery. Amero does teach a possibility of using a fuel-air mixture at the inlet to the rotor stack, the equivalent to having no igniter ports. However, as is discussed below the higher the operational temperature of the turbine, the higher the likelihood a fuel-air mixture will ignite prior to reaching the periphery of the inlet rotor edge. Without empirical data, it is not known if pre-ignition of the fuel-air mix (i.e. ignition while still inside the "compressor space", before reaching the rotor chamber periphery) will be detrimental to the turbine operation.

While boundary layer turbines may operate with liquid fuels, such turbines are very well suited for use with fuels that are gaseous under ordinary conditions (e.g. room temperature and pressure). Examples of such fuels that are readily available are methane, ethane, ethylene, acetylene, propylene, propane, butylene, or butane. The leading candidates in that list (i.e. methane through propane) can be ignited, in the presence of sufficient oxygen, by passage over a platinized surface. In line with discussion above, porting for an igniter system can be done away with entirely, if the chosen fuel will ignite when passed over a platinized surface. The interior surface of the disk-rotor housing might be constructed with a platinized surface. The BLT might be started by spinning the rotor up to an acceptable starting RPM, followed by introducing both air via the proximal inlet and fuel via the fuel inlet(s). Centrifugal force would force the fuel-air mixture into intimate contact with the platinized surface and combustion would take place. Platinized surfaces can be "poisoned" by fuels contaminants (e.g. sulfur), so fuel purity would be an issue for such an ignition system.

Most gaseous fuels and some liquid fuels might be heated beyond their auto-ignition temperature by use of energy/light emitted from a high-power, light emitting diode (LED). High-power LEDs with tightly focused beams are readily available. The emission wavelength of the LED may be chosen to maximize the absorbance of the emitted light and, thus, heat the fuel past its auto-ignition temperature, just as it leaves the fuel inlet port into the rotor housing. The LED would be positioned away from the combustion space such that its beam was emitted to pass through the fuel and into the fuel inlet port. Likewise, high-power LEDs that emit in the UV range are also available. Again, the emission wavelength of the LED may be chosen for its ability to ionize or cause molecular scission in the fuel, just as it leaves the fuel inlet port into the rotor housing. Incorporating an LED to heat or ionize the fuel in the fuel inlet reduces the number of turbulence-inducing ports in the periphery of the rotor housing.

For fuels that have an auto-ignition temperature that is below their pyrolysis temperature, a glow plug (also known as a hot-surface igniter) can be incorporated into the fuel inlet port. As the fuel passes over the glow plug, it is heated to the point that the fuel will auto-ignite, when it comes into contact with oxygen. Incorporating the glow plug inside the fuel inlet reduces the number of turbulence-inducing ports in the periphery of the rotor housing by removing ports needed for igniters. Once the turbine reaches normal operating temperature, the glow plug(s) can be turned off, since the introduction of fuel into the rotor housing will bring the fuel into contact with gas and surfaces that are already above the ignition temperature for the fuel. A variation on glow plugs uses a heated wire made from a catalytic material, e.g. platinum wire.

It may be desirable to use fuels that do not lend themselves to ignition; either by contacting a platinized surface or by use of a spark igniter, when the fuel has not been sufficiently aerosolized or vaporized. Since a BLT at normal operating temperature will ignite most any fuel one might care to use, another approach would be to use a "starter fuel" to bring the rotor compartment up to desired operational temperature and then switch over to the default fuel. For example, a small tank of propane or acetylene, might supply fuel to the rotor housing during the initial start of operation. This starter fuel can be ignited via any of the igniter options that have been discussed. Once the rotor housing reaches an acceptable temperature, the starter gas can be turned off as the regular operational fuel flow is started. This would permit the use of heavier petroleum fuels without having to vaporize or aerosolize the main operating fuel sufficiently for a classical spark igniter to work successfully. It is likely, however, that a starter fuel would require a separate fuel inlet, which would operate against the teaching of minimizing the number of inlet ports in the rotor housing, to reduce turbulence.

Amero teaches only "a plurality of disks" in the rotor disk stack. Boundary layer turbines work through drag of air flow over the disk surfaces. Increasing the number of disks increases the surface area exposed to the gas flow. However, as the number of disks increases, the proportion of the available gas flow to interact with the surface of a given disk decreases, so there can be a point of diminishing returns for adding one more disk to a given configuration.

It is known that boundary layer turbines work better with smaller inter-disk spacing because there is more resistance to flow between the disks at closer spacing. Also, using thinner disks has multiple benefits including: i) reduced weight of the disk-rotor stack; ii) reduced materials costs; and, in the case of a boundary-layer turbine used as combustion engine, iii) greater heat transfer from the hot to cold side of each rotor disk. Amero is silent on these issues and, to the extent that the example drawings provided in his patent are at least somewhat "to scale", Amero minimizes the importance of using thin, closely spaced disks.

Further, there is the question of different disk spacing for intake and exhaust channels. If the spacing between the disks for air intake, is less than the spacing between the disks for exhaust, there will be greater drag imparted on the gas flow of intake air and, ignoring bulk mass and temperature considerations, this will favor driving intake air to the disk periphery. It will also cause less drag on the exhaust gas stream which could reduce the amount of power derived from the exhaust stream.

The literature on boundary layer turbines has thoroughly documented the importance of rotor geometry on the performance of such turbines. Some references suggest diminishing returns on performance for keeping the port diameter much less than 40% of the overall disk diameter.

The area of porting (either inlet ports for air or outlet ports for exhaust gases) imposes an effective limit on the number of disks that can be used in the disk-rotor stack. Taking the inlet air flow as an example, the total area of the inlet ports (on the face of first disk of the disk-rotor stack) provides the air that will flow through each of the slits that open into the inter-disk space. Once the total area of these slits exceeds the area of the inlet ports on the first disk, any further disks, added to the disk-rotor stack, will be choked for air flow. Likewise, on the outlet side, the total area of the outlet ports on the final disk face limits the flow through all of the slits that open into the inter-disk space for exhaust. The use of pressurized air supply can help mitigate the choking problem for disk stacks with a large number of disks.

Amero is silent on the placement, shape, and alignment of fuel ports. Typically, boundary layer turbines are designed with very little space between the periphery of the disk-rotor stack and the outer housing. If the disk stack is thick in the axial dimension, this can inhibit proper mixing of fuel and air. It may be desirable to have multiple fuel ports aligned along the axial dimension of the disk stack to provide a more uniform distribution of fuel. The shape and alignment of the ports should be such as to minimize the formation of turbulence in the space between the disk-rotor stack and the outer housing.

FIG. 7 is a table presenting characteristics of different materials that may be used uniquely in embodiments of the present invention. The table contains information for silicon, silicon carbide, silicon nitride, nickel, and Inconel 625 (a high-temperature steel alloy commonly used in turbine engines). The cited information is from measurements taken at high temperature (closest to 1270 degrees K, when such data were available). The three silicon-based materials are already commercially available as thin disks, from the semiconductor industry, and are available in thicknesses and diameters that are relevant to the desired embodiments of the BLT of the instant invention.

While Inconel 625 has a number of desirable material properties and scores well in the table (relative ranking of 34 versus 37.5 for silicon carbide), a downside is polycrystalline structure. It would be virtually impossible to adequately remove the residual stresses imparted while rolling it into thin sheets. The three silicon-based materials are easily obtained in thin, single-crystal disks (0.4 mm thick) from semiconductor industry. These semiconductor blanks have a high degree of flatness and are not as prone to warping or creep, in the high temperature environment, as rolled Inconel 625 sheet might be. Nickel has less desirable material properties, compared to the other candidates, while suffering from the same issues that come with the use of polycrystalline Inconel 625.

The BLT in embodiments of the instant invention is a combustion engine operating at high temperatures. The higher the safe maximum operating temperature, the higher will be the Carnot efficiency limit of that engine, as discussed below. As shown in the table of FIG. 7, both silicon carbide (SiC) and silicon nitride (Si3N4) have very high, safe, maximum operating temperature in oxidative environments.

To minimize warping of the disks due the temperature gradient in which these will operate, the lower the coefficient of thermal expansion the better. The silicon-based options have a significantly lower coefficient of thermal expansion than either Ni or Inconel 625.

Heat recovered from exhaust gases and imparted into the intake air will be beneficial to overall engine efficiency. To that end, the higher the coefficient of thermal conductivity the better. Amero teaches that one embodiment of his engine would allow the intake air to be pre-mixed with the fuel. If the intake air/fuel mixture is heated above the auto-ignition temperature for that fuel, combustion will occur inside the intake inter-disk space rather than at the periphery of the disk rotor stack. This will adversely impact overall efficiency due energy being imparted speeding up the bulk flow velocity of exhaust gases before reaching the periphery. It could also require reducing the average ambient combustion temperature at the disk edge to prevent the edge from exceeding the safe maximum operating temperature. Such a reduction temperature would adversely impact Carnot efficiency by reducing Tmax.

A higher melting point, for disk materials, raises the effective operational temperature. This, in turn increases the maximum theoretical efficiency of the engine. FIG. 8 is a table that shows estimates for overall Carnot efficiency for an BLT driving an electrical generator based on the following assumptions:

1) Flame temperature for common gas jets at or near ambient pressure range between 2175 to 2275 degrees K. The Tmax, used for the Carnot equation, was set at 2150 K. Internal combustion engines can have a much higher flame temperatures, associated with higher compression ratios, but the Amero BLT will be a low-pressure engine.

2) Exhaust temperature cannot be less than ambient (taken here to be 300 deg. K) nor will it be higher than the maximum safe operating temperature for the disk material. For this table it was assumed that the disk would be made from either SiC or Inconel 625, either of which will operate safely up to 900 deg. K. The table covers exhaust temperature (Tmin for the Carnot equation) in the range of 300 to 900 K.

3) Carnot efficiency of the combustion was calculated as equal to (Tmax−Tmin)/Tmax.

3) Generator conversion efficiency (mechanical shaft energy in converted to electricity out) is assumed to be 95% or 0.95.

4) Estimates for the efficiency of boundary-layer turbines (converting energy in a high temperature, high velocity stream of gas, coming in, to shaft rotational energy out), found in the literature, range between 40% and 95%. The table results for overall system efficiency are presented in three columns assuming BLT efficiency of 40%, 68%, or 95% respectively.

5) Estimation of overall system efficiency was calculated as the product of Carnot efficiency times Generator conversion efficiency times the chosen BLT efficiency. As can be seen in the table of FIG. 8, even at the highest exhaust temperature and the worst BLT efficiency (900 K and 40%, respectively), the overall system efficiency will be ca. 22%. This compares to a well-tuned, gasoline, piston engine coupled to a generator, providing ca. 23% to 28% overall system efficiency (fuel to shaft rotational energy to electrical energy out). At high disk RPM and lower rates of gas throughput, which will lead to higher BLT efficiency and lower exhaust temperature (i.e. higher Carnot efficiency) it is conceivable that the overall system efficiency for an Amero BLT/generator could be well above 50%. This would be comparable to the overall system efficiency of large-scale steam-powered electrical plants.

To support high rotational speeds and minimize distortions and vibrations, it is desirable for the disk material to possess a high ultimate tensile strength, a high elastic modulus, and a high shear modulus. Both SiC and Si3N4 score well in comparison to Ni and Inconel 625. As noted above, the two metals will both be polycrystalline, in their most common commercial forms. So, despite Si not scoring as well as nickel or Inconel 625, single-crystal Si disks may still be preferable to disks fabricated from Ni sheet or Inconel 625 sheet.

Following is a discussion on surface coatings on disks used in BLT engines. While running at very high temperatures improves the maximum possible Carnot efficiency of a heat engine, it also increases the likelihood that a combustion engine will produce undesirable oxides of nitrogen (NOx). Modern combustion engines cope with the environmental impact of these compounds by running the exhaust gases through a catalytic convertor to remove NOx. The two most common catalytic agents are platinum and palladium metal, but other materials can be used. Coating the surface of each disk, that faces the exhaust gases, with one of these or similar materials would allow for some remediation of the exhaust gases before these even exited the engine. As well, since the reactions that either of these metals promotes is temperature dependent, it would also be possible to maximize their effect by coating a band of a particular metal at a radius range most likely to see the appropriate temperature for the reaction one seeks to promote.

When boundary layer turbines are used as pumps, the peak pressure achieved is at the periphery of the disk stack and is proportional to disk RPM. A very likely intended use for an Amero BLT would be driving an electric generator. Such use would favor 6,000, 8,000, 12,000, or 24,000 rpm (assuming 4, 3, 2, or 1 set of poles) to produce 400 Hz output. Similar arguments can be made for RPMs that will produce either 50 or 60 Hz output.

Amero teaches the use of compressed air only to facilitate starting the turbine engine. Amero envisions that the pumping action of the boundary-layer turbine will suffice for supplying intake air. Due to imperfections and asymmetries in the production of the disk stack, it is likely that there will be a preferred direction flow through the turbine. However, unless disk spacings are deliberately mismatched, that preferred direction will vary from disk stack to disk stack.

Amero teaches "It will be understood that fluids will continue to flow through the turbine 10 in the direction indicated by the arrows in FIGS. 1 and 2 by virtue of the radially and outwardly moving intake air being relatively cool and dense as compared to the radially and inwardly moving combustion products. The disks 94, 96 and 98 each serve dual functions in that one side of each of said disks served to compress incoming air while the other side of each of such disks serves as a turbine with respect to the combustion products."

As is discussed, this teaching is counterproductive and possibly false. Addressing first the counterproductive aspect, heat transmission through the disk, from the hot exhaust side to the colder intake side, will play an important role in the overall efficiency of the engine. Disk material should be chosen for high thermal conductivity. To the extent that is done and to the extent that disk area per unit mass flow is maximized, this will lessen the temperature differential between the intake air and the exhaust gases at any given radius from the center axis of the disk stack. This will lessen the density gradient difference between the intake and exhaust side and work against the pumping action that Amero discloses.

With regards to the possible error in Amero's teaching, consider a desired embodiment of the BLT running at steady-state power output. Steady-state operation implies that the flow of intake air and fuel in and the flow of exhaust gases out is not varying. A desired embodiment of the BLT would have an equal number of equivalently dimensioned, inter-disk spaces for the intake air and for the exhaust gases. Thus, at any given instant in time, the inter-disk volume containing intake air will equal the inter-disk volume containing exhaust gases. The mass of those exhaust gases will equal the mass of the intake air used plus the mass of the fuel consumed. While the intake air will always be colder than the exhaust gas at any given radius, the mass of the fuel will, most likely, equal or outweigh the slightly higher density of the colder air.

As well, the bulk momentum of the two volumes of gas must be taken into consideration. While the volume of colder intake air might possess more mass than the equal volume of the hotter exhaust gas, the hotter exhaust gas will possess greater bulk velocity (this fact provides the incentive to build this engine in the first place). For the pressure gradient, in each volume, to be close to balance, as these will be in steady state operation, the bulk momentum of each volume of gas must be similar.

Furthermore, a balanced disk stack design (i.e. even spacing between all disks) will provide only minimal draw of intake air. So, if high flow is desired (and would be, if one wishes high horsepower), the spacing of intake disk channels will have to be narrower than exhaust channel disk spacing. Finally, demand for higher power output will require higher shaft RPM in order to induce higher intake gas flow. One desirable intended use for the BLT would be as motive power for a generator and, if used for that purpose, the shaft RPM would be constrained to a very narrow range. Continuous use of pressurized inlet air frees up engine design constraints so that rotor stack configuration is not obligated to provide any desired air flow through the engine.

The maximum pressure for the combustion chamber is likely to be less than one atmosphere (14.7 psi) over ambient, so the housing can be quite light weight. As well the maximum pressure for driving intake air would also be quite low. Presuming a closed system, the maximum pressure one could develop with a BLT (modeled as a turbine pump) would be given by the pressure equation for an ultrahigh-speed gas centrifuge:

$$Pr = Pi \times e^{(Ai \times r^2)}$$

where: $Pr$=Pressure at radius r
$Pi$=Pressure at ambient
$e$=natural log constant
$Ai = (Mi \times w^2)/2\, Rg\, T$
$r$=radius of rotation in meters
$Mi$=molar mass of the component gas, in AMU
$w$=angular velocity in radians per second
$Rg$=gas constant=8314.46 AMU$\times$(m/s)$^2$/deg. K
$T$=temperature (K)

Tables in FIGS. 9 and 10 show the ratio of Pr/Pi (or Pr in standard atmospheres) based on disk stack radius from 0.045 to 0.16 meters and angular velocity from 6,000 to 24,000 RPM. The shaded cells indicate rotor periphery in excess of 343 m/s (the speed of sound in air). This also assumes that peripheral gas velocity is the same as the rotor edge velocity. Boundary-layer turbines achieve this parity only at very low gas through-put. What this means is that the values listed in the table are an upper limit for pressure. The table in FIG. 9 assumes ambient temperature (300 K) and an average molar mass for air of 28.97. The table in FIG. 10 assumes the flame temperature of 2150 degrees K and an average molar mass for the exhaust gas of 31.52. As can be seen by comparing cells for the same radius and RPM, the pressure at the periphery during operation, with combustion, will be not only lower than the pressure seen at low temperature but also not significantly above ambient pressure.

When coupled to a generator, the shaft speed will be fixed to achieve a desired frequency output. In a bladed turbine or a positive-displacement engine, running at a narrowly constrained range of RPM, variations in load demand can only be addressed by variations in fuel flow. This means that operation at less than full power output will also be at non-stoichiometric fuel/air ratios that can adversely affect overall engine efficiency and promote the production of undesirable exhaust composition (e.g. running combustion processes lean often leads to increased NOx production). Since the Amero BLT is a turbine running in a closed system, both the air flow and fuel flow can be adjusted to meet variations in power demand. This would be achieved by using a compressed air source and metering the flow of both intake air and fuel. The requirement to power an auxiliary air compressor will need to be taken into account when calculating overall engine efficiency.

A person of ordinary skill in the art will understand that the improvements proposed in this specification, and the apparatus proposed to accomplish those improvements are exemplary only, and not limiting to the scope of the invention. The invention is only limited by the claims.

I claim:

1. A boundary layer turbine (BLT) engine, comprising:
a housing formed by an outer cylinder having an inside diameter and a first and a second faceplate joined to opposite sides of the outer cylinder;

a turbine shaft passing centrally through the two faceplates;

a stack of alternating disks and spacers with central holes, the disks and spacers joined to the turbine shaft through the central holes, the disks having a common diameter less than the inside diameter of the outer cylinder and the spacers having a common diameter less than the common diameter of the disks, leaving a cylindrical space outside the disk stack and inside the outer cylinder as a combustion zone;

an air inlet port through the first faceplate;

an exhaust port through the second faceplate;

a fuel port through the outer cylinder;

an ignition device communicating with the combustion zone;

a first channel for air from the air inlet port to first alternating spaces between disks and through first openings in the disks and spacers to the combustion zone; and a second channel for exhaust from the combustion zone to second alternating spaces between disks and through second openings in the disks and spacers to the exhaust port.

2. The BLT of claim 1 wherein the disks and spacers are alternated in the stack with an odd number of disks and an even number of spacers, the stack having a disk at each end, the disks and spacers are intimately adjacent in the stack, the disks and spacers are oriented in a specific way relative to the turbine shaft and are rotationally fixed relative to the turbine shaft.

3. The BLT of claim 1 wherein the disks and spacers are formed from solid disks of silicon-based material.

4. The BLT of claim 3 wherein the silicon-based material is one of Si, SiC, or Si3N4.

5. The BLT of claim 3 wherein there are 21 disks and 20 spacers with a common thickness of 0.029 inch.

6. The BLT of claim 1 wherein the ignition device is a platinized surface in the combustion zone.

7. The BLT of claim 1 wherein the ignition device comprises a light-emitting diode (LED).

8. The BLT of claim 1 wherein one end of the turbine shaft has an interface to a shaft of a starter motor.

9. The BLT of claim 1 further comprising an air compressor coupled to the air inlet port and adapted to compress air into the inlet port.

10. The BLT of claim 1 wherein the spacers between disks channeling intake air to the combustion zone have a lesser thickness than the spacers between disks providing exhaust channeling.

11. A method for implementing a boundary layer turbine (BLT) engine, comprising:

forming a housing by an outer cylinder having an inside diameter and a first and a second faceplate joined to opposite sides of the outer cylinder;

passing a turbine shaft centrally through the two faceplates;

providing an air inlet port through the first faceplate;

providing an exhaust port through the second faceplate;

joining a stack of alternating disks and spacers with central holes to the turbine shaft through the central holes, the disks having a common diameter less than the inside diameter of the outer cylinder and the spacers having a common diameter less than the common diameter of the disks, leaving a cylindrical space outside the disk stack and inside the outer cylinder as a combustion zone, the disks and spacers have openings proximate the central hole such that two separate channels are formed through the disk and spacer stack parallel to the turbine shaft, one channel channeling air from the air inlet port to alternating spaces between disks such that channeled incoming air travels outward between disks to the combustion zone, and the other channel channeling exhaust from the combustion zone, the exhaust traveling inward from the combustion zone in alternating spaces between disks other than the alternating spaces carrying air to the combustion zone, and thence through the exhaust channel to the exhaust port;

providing a fuel port through the outer cylinder;

communicating an ignition device with the combustion zone;

injecting fuel into incoming air in the combustion zone;

igniting the fuel air mixture; and providing torque to the turbine shaft by boundary layer friction between the exhaust gases and disk surfaces.

12. The method of claim 11 comprising alternating the disks and spacers in the stack with an odd number of disks and an even number of spacers, the stack having a disk at each end, the disks and spacers intimately adjacent in the stack, the disks and spacers oriented in a specific way relative to the turbine shaft and rotationally fixed relative to the turbine shaft.

13. The method of claim 11 comprising forming the disks and spacers from solid disks of silicon-based material.

14. The method of claim 13 comprising forming the disks from one of Si, SiC, or Si3N4.

15. The method of claim 13 making the number of disks 21 and of spacers 20 with a common thickness of 0.029 inch.

16. The method of claim 11 comprising using a platinized surface in the combustion zone as the ignition device.

17. The method of claim 11 comprising using a light-emitting diode (LED) as the ignition device.

18. The method of claim 11 comprising starting the BLT by spinning the turbine shaft and disk stack by a starter motor interfaced to the turbine shaft up to a desired starting RPM, introducing air at the air intake port, introducing fuel at the fuel port, and igniting the fuel air mixture to start the BLT.

19. The method of claim 11 comprising feeding pressurized air to the air inlet port.

20. The method of claim 11 comprising making the spacers between disks channeling intake air to the combustion zone of a lesser thickness than the spacers between disks providing exhaust channeling.

* * * * *